United States Patent
Kobayashi

(10) Patent No.: US 7,283,009 B2
(45) Date of Patent: Oct. 16, 2007

(54) DUAL BAND VOLTAGE-CONTROLLED OSCILLATOR

(75) Inventor: Hiroki Kobayashi, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 89 days.

(21) Appl. No.: 11/353,684

(22) Filed: Feb. 14, 2006

(65) Prior Publication Data

US 2006/0240768 A1    Oct. 26, 2006

(30) Foreign Application Priority Data

Feb. 24, 2005   (JP)   ............................. 2005-049395

(51) Int. Cl.
 *H03B 5/12*   (2006.01)
(52) U.S. Cl. .................................. 331/179; 331/117 R
(58) Field of Classification Search ................. 331/179, 331/117 R, 49
See application file for complete search history.

(56) References Cited

U.S. PATENT DOCUMENTS

| 4,442,415 A * | 4/1984 | Ashida ........................ 332/136 |
| 5,852,384 A | 12/1998 | Sakakura et al. |
| 5,982,243 A * | 11/1999 | Pope ............................ 331/59 |
| 6,292,063 B1 * | 9/2001 | Tanemura et al. ............ 331/49 |

FOREIGN PATENT DOCUMENTS

JP          5-226935         9/1993

* cited by examiner

*Primary Examiner*—Joseph Chang
(74) *Attorney, Agent, or Firm*—Brinks Hofer Gilson & Lione

(57) ABSTRACT

A resonance circuit is interposed between a base and a collector of an oscillating transistor and is configured such that a resonance frequency is switched in correspondence with two different frequency bands. A first feedback unit is interposed between the base and an emitter of the oscillating transistor and a second feedback unit is interposed between the emitter and the collector of the oscillating transistor. One of the first feedback unit and the second feedback unit is configured by series-parallel connection of three reactive elements so as to exhibit one of inductive and capacitance characteristics in the two different frequency bands, and the other feedback unit is configured so as to exhibit the same characteristic as that of one feedback unit. As a result, oscillation is performed in the two frequency bands.

7 Claims, 5 Drawing Sheets

DUAL BAND VOLTAGE-CONTROLLED OSCILLATOR

BACKGROUND OF THE INVENTION

1. Field of the Invention

The present invention relates to a dual band voltage-controlled oscillator circuit which stably oscillates in different frequency bands.

2. Description of the Related Art

An oscillator circuit according to the related art, which is used in an FM or TV audio receiver or a local oscillator of a dual band-compliant cellular phone, will be described with reference to FIG. 9. A trimmer capacitor 1 is interrupted by a switch 2 and is connected parallel to a series circuit of an oscillating coil 3 and a coil 4 when the switch 2 is grounded. The switch 2 is also used to short-circuit the coil 4. The series circuit of the oscillating coil 3 and the coil 4 is connected parallel to a series circuit of a padding capacitor 8 and a variable capacitor 5. The padding capacitor 8 is short-circuited by a switch 6.

A base of an oscillating transistor 10 is connected to one end of the padding capacitor 8 through a capacitor 9. A capacitor 14 is connected between the base and an emitter of the oscillating transistor 10, and a capacitor 12 is connected parallel to the capacitor 14 to be interrupted by a switch 13. The emitter of the oscillating transistor 10 is grounded through a resistor 18 and a capacitor 17. A resistor 11 is provided between a collector and a base of the oscillating transistor 10. The collector thereof, to which power is applied through a resistor 16, is grounded through a capacitor 15. The base thereof is grounded through a resistor 19. An oscillation output is supplied to a mixer through a capacitor 7.

In this local oscillator, the capacitor 12 is connected parallel to the capacitor 14 between the base and the emitter of the oscillating transistor 10 by the switch 13 at the time of receiving an FM band, thereby ensuring an oscillation frequency and realizing high stability. At the time of receiving one of TV channels of 4 to 12, the switch 2 is connected to a TV terminal to be grounded. The switch 6 is turned off, and thus a lower limit frequency is limited by the padding capacitor 8. At the time of an FM band, the switch 2 is connected to an FM terminal, and thus the trimmer capacitor 1 is grounded. Further, the switch 6 and the switch 13 are turned on. If the switch 6 is turned on, the capacitor 12 is connected between the base and the emitter of the transistor 10, whereby stable oscillation is realized.

In the above-described oscillator circuit, in a band having a low oscillation frequency, a value of negative resistance on the oscillating transistor is insufficient, and thus oscillation stability is lowered. Accordingly, in the band having the low oscillation frequency, in order to ensure oscillation stability, a capacitance value between the base and the emitter of the oscillating transistor is made large. To this end, however, a switch and a circuit for controlling the switch are additionally required, which complicates the oscillator circuit.

SUMMARY OF THE INVENTION

It is an object of the invention to provide an oscillator circuit which can obtain negative resistance on an oscillating transistor sufficiently in two separate frequency bands, thereby stably oscillating in any frequency band.

According to a first aspect of the invention, an oscillator circuit includes an oscillating transistor, a resonance circuit that is interposed between a collector and a base of the oscillating transistor, a first feedback unit that is interposed between the base and an emitter of the oscillating transistor, and a second feedback unit that is interposed between the collector and the emitter of the oscillating transistor. In this case, the resonance circuit is configured such that a resonance frequency is changed in correspondence with two different frequency bands. Further, one of the first feedback unit and the second feedback unit is configured by series-parallel connection of three reactive elements so as to exhibit one of inductive and capacitive characteristics in the two frequency bands, and the other feedback unit is configured so as to exhibit the same characteristic as that of one feedback unit in the two frequency bands.

According to a second aspect of the invention, in the oscillator circuit according to the first aspect of the invention, one of the first feedback unit and the second feedback unit may have a first capacitive element, and the other may have a parallel resonance circuit, which has a second capacitive element and a first inductive element to be connected parallel to each other, and a third capacitive element connected in series to the parallel resonance circuit.

According to a third aspect of the invention, in the oscillator circuit according to the first aspect of the invention, each of the first feedback unit and the second feedback unit may have a parallel resonance circuit, which has a second capacitive element and a first inductive element to be connected parallel to each other, and a third capacitive element connected in series to the parallel resonance circuit.

According to a fourth aspect of the invention, in the oscillator circuit according to the first aspect of the invention, one of the first feedback unit and the second feedback unit may have a first capacitive element, and the other may have a parallel resonance circuit, which has a fourth capacitive element and a second inductive element connected in series, and a fifth capacitive element connected parallel to the parallel resonance circuit.

According to a fifth aspect of the invention, in the oscillator circuit according to the first aspect of the invention, each of the first feedback unit and the second feedback unit may have a series resonance circuit, which has a fourth capacitive element and a second inductive element connected in series, and a fifth capacitive element connected parallel to the series resonance circuit.

According to a sixth aspect of the invention, in the oscillator circuit according to the first aspect of the invention, the resonance circuit may have an inductor and a capacitive unit connected parallel to the inductor, and an inductance value of the inductor may be switched different in the two frequency bands.

According to a seventh aspect of the invention, in the oscillator circuit according to the sixth aspect of the invention, the capacitive unit may have a varactor diode, to which a control voltage for changing an oscillation frequency is applied.

DESCRIPTION OF THE PREFERRED EMBODIMENT

Figure 1:
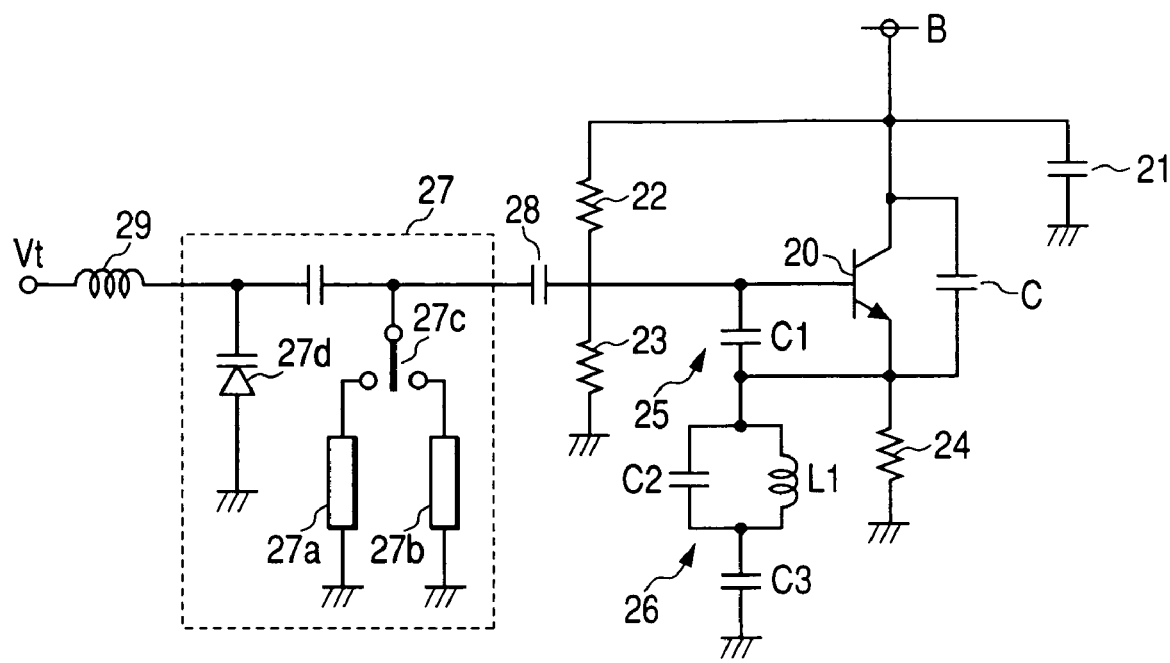
FIG. 1 is a circuit diagram showing a first embodiment of an oscillator circuit according to the invention.

An oscillator circuit according to the invention will now be described with reference to FIG. 1. FIG. 1 shows a first embodiment. Referring to FIG. 1, a collector of an oscillating transistor 20 is connected to a power supply B and is simultaneously grounded through a high-pass capacitor 21. A bias voltage, which is divided by resistors 22 and 23, is applied to a base of the oscillating transistor 20. Further, an emitter of the oscillating transistor 20 is grounded through a resistor 24.

A first feedback unit 25 is interposed between the base and the emitter of the oscillating transistor 20. The first feedback unit 25 has a first capacitive element C1. Further, a second feedback unit 26 and a feedback unit C with a fixed capacitance value are interposed between the collector (ground) and the emitter of the oscillating transistor 20. The second feedback unit 26 is a series-parallel connection circuit having a parallel resonance circuit, which has a second capacitive element C2 and a first inductive element L1 connected parallel to each other, and a third capacitive element C3 connected in series to the parallel resonance circuit.

A resonance circuit 27 is interposed between the base and the collector (ground) of the oscillating transistor 20. One end of the resonance circuit 27 is grounded and the other end thereof is connected to the base of the oscillating transistor 20 through a clamp capacitor 28. Two inductors 27a and 27b constituting the resonance circuit 27 have different inductance values. One end of each of the inductors 27a and 27b is grounded, and the other end is selectively connected to the clamp capacitor 28 through switching of a switch 27c. Further, an anode of a varactor diode 27d constituting the resonance circuit 27 is grounded and a cathode thereof is coupled to the clamp capacitor 28. And then, a control voltage from a control terminal Vt is applied to the cathode of the varactor diode 27d through a choke inductor 29.

With the above-described connection, a common collector Colpitts oscillator circuit (voltage-controlled oscillator circuit) is implemented.

Figure 4:
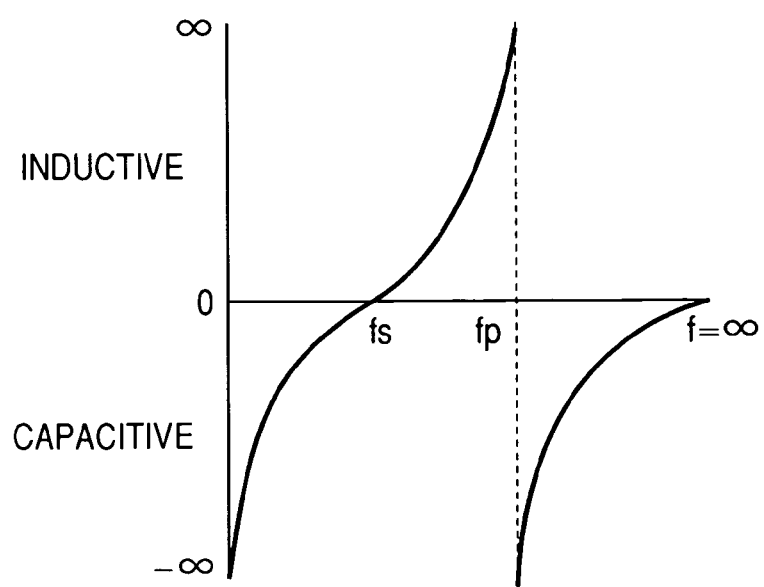
FIG. 4 is a reactance characteristic view of a feedback unit in an oscillator circuit according to the invention.

Now, reactance characteristics of the second feedback unit 26 will be considered. As shown in FIG. 4, this circuit has a parallel resonance frequency fp and a series resonance frequency fs lower than the parallel resonance frequency fp. Accordingly, this circuit exhibits a capacitive characteristic in a frequency band equal to or lower than the series resonance frequency fs and in a frequency band equal to or higher than the parallel resonance frequency fp. Therefore, by switching equivalent capacitive elements with different capacitance values, the emitter and the collector can be considered to be connected to each other. And then, by setting a constant of this circuit, the capacitance values suitable for two different frequency bands can be obtained.

Accordingly, negative resistance required for an oscillation operation can be obtained on the oscillating transistor 20 including the first and second feedback units 25 and 26, and thus a Colpitts oscillator circuit can be implemented in these frequency bands. Further, oscillation frequency can be set in these frequency bands by switching the inductors 27a and 27b of the resonance circuit 27.

Figure 2:
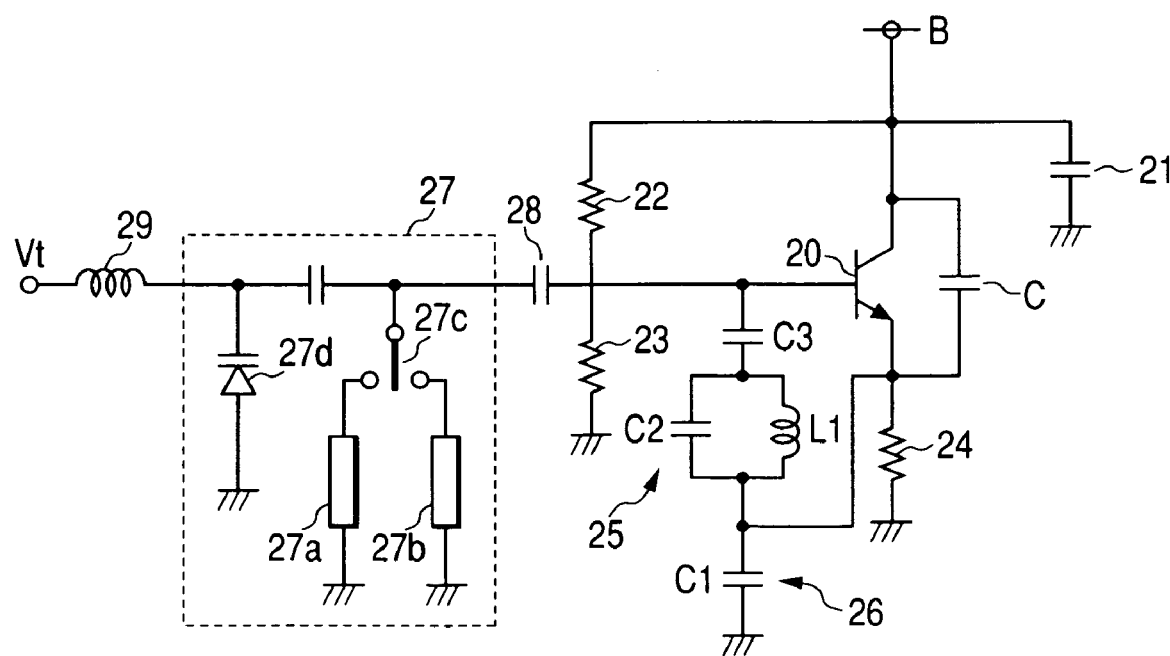
FIG. 2 is a circuit diagram showing a second embodiment of an oscillator circuit according to the invention.

FIG. 2 shows a second embodiment. Referring to FIG. 2, a first feedback unit 25 has a parallel resonance circuit, which has a second capacitive element C2 and a first inductive element L1 connected parallel to each other, and a third capacitive element C3 connected in series to the parallel resonance circuit. Further, a second feedback unit 26 has a first capacitive element C1. Therefore, in FIG. 2, the configuration of the first feedback unit 25 and the configuration of the second feedback unit 26 are opposite to those in FIG. 1. Other parts are the same as those in FIG. 1.

Figure 3:
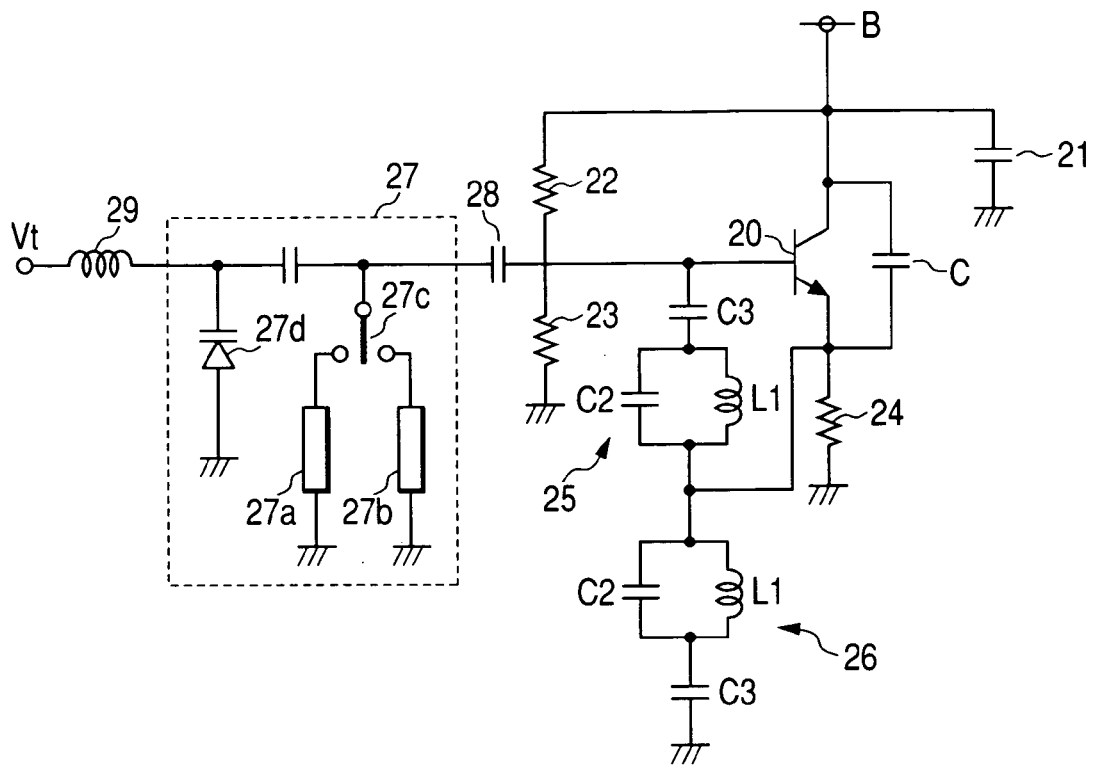
FIG. 3 is a circuit diagram showing a third embodiment of an oscillator circuit according to the invention.

FIG. 3 shows a third embodiment. Referring to FIG. 3, each of a first feedback unit 25 and a second feedback unit 26 has a parallel resonance circuit, which has a second capacitive element C2 and a first inductive element L1 connected parallel to each other, and a third capacitive element C3 connected in series to the parallel resonance circuit. Other parts are the same as those in FIG. 1. Moreover, a circuit constant of the first feedback unit 25 and a circuit constant of the second feedback unit 26 are not necessarily equal to each other.

Figure 5:
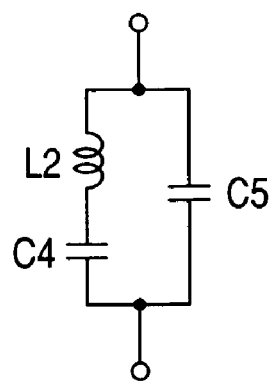
FIG. 5 is a circuit diagram showing another configuration of a feedback unit in an oscillator circuit according to the invention.

Further, as shown in FIG. 5, each of the first feedback unit 25 and the second feedback unit 26 may have a series resonance circuit, which has a fourth capacitive element C4 and a second inductive element L2 connected in series, and a fifth capacitive element C5 connected parallel to the series resonance circuit, instead of the series-parallel connection circuit having the second capacitive element C2, the first inductive element L1, and the third capacitive element C3.

Moreover, in FIGS. 1 to 3, the resonance circuit 27 including the clamp capacitor 28 exhibits the inductive characteristic in an oscillation frequency band. The feedback unit C is not necessarily provided.

Figure 6:
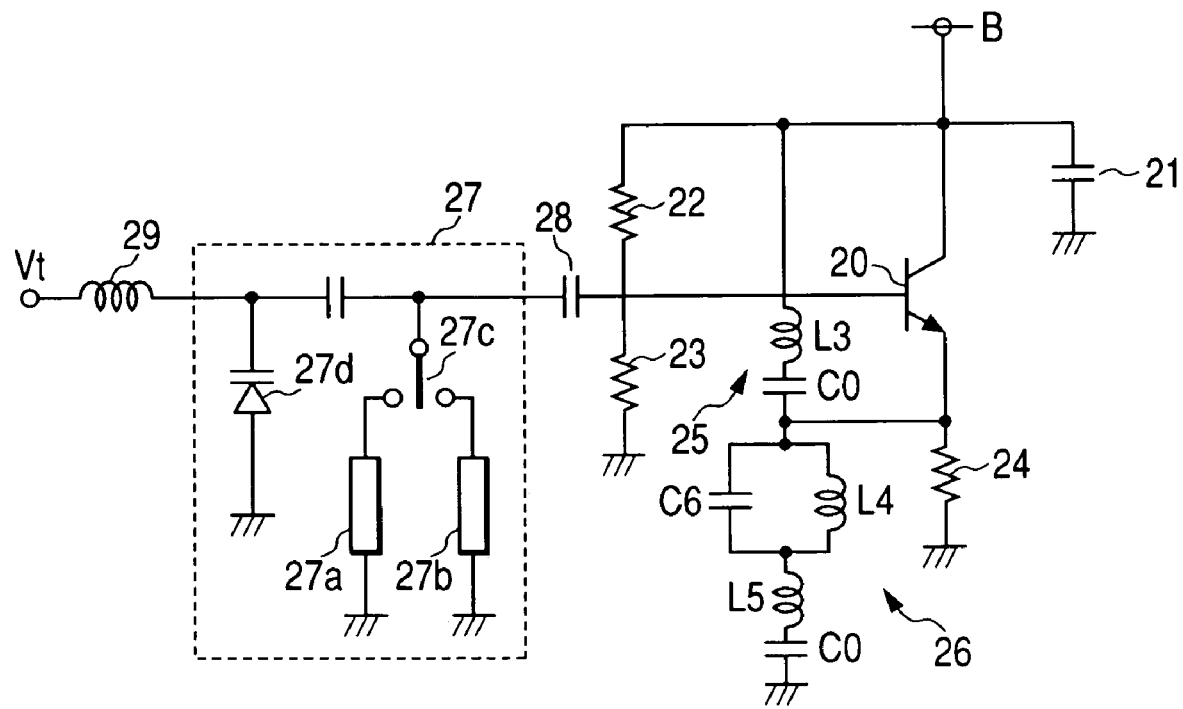
FIG. 6 is a circuit diagram showing a fourth embodiment of an oscillator circuit according to the invention.

FIG. 6 shows a fourth embodiment. Referring to FIG. 6, a first feedback unit 25 has a third inductive element L3. A capacitor C0 for cutting a direct current is connected in series to the third inductive element L3. A second feedback unit 26 has a parallel resonance circuit, which has a sixth capacitive element C6 and a fourth inductive element L4 connected parallel to each other, and a fifth inductive element L5 connected in series to the parallel resonance circuit. The capacitor C0 for cutting a direct current is also connected in series to the second feedback unit 26. Other parts are the same as those in FIG. 1. The resonance circuit 27 exhibits the capacitive characteristic.

Figure 7:
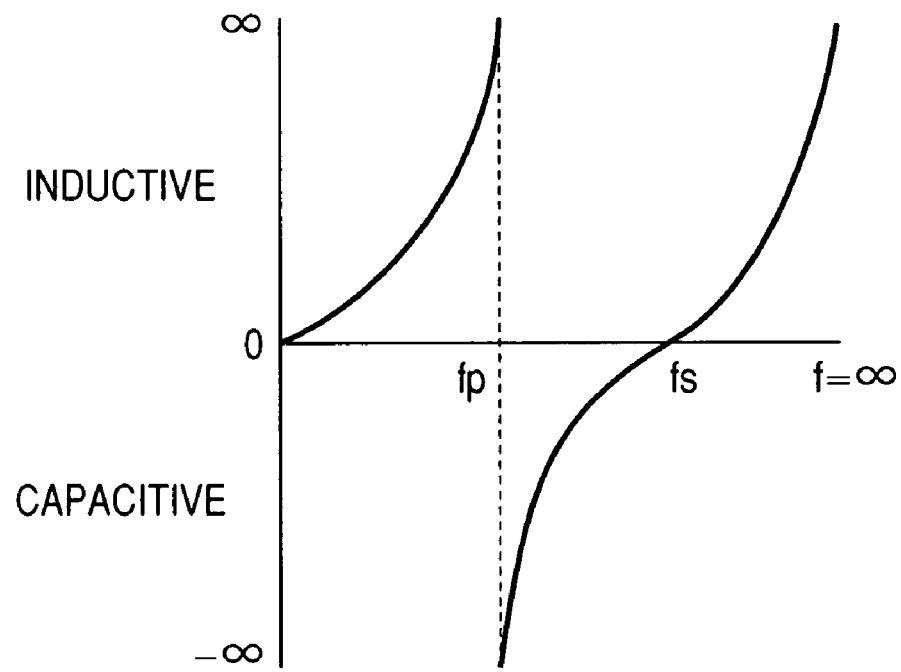
FIG. 7 is a reactance characteristic view of another feedback unit in an oscillator circuit according to the invention.

Here, the second feedback unit 26 in FIG. 6 has the reactance characteristics shown in FIG. 7 and has a parallel resonance frequency fp and a series resonance frequency fs higher than the parallel resonance frequency fp. Accordingly, the second feedback unit 26 exhibits the inductive characteristic in a frequency band equal to or lower than the parallel resonance frequency fp and in a frequency band equal to or higher than the series resonance frequency fs. Therefore, in the embodiment of FIG. 6, a Hartley oscillator circuit can be implemented. As a result, oscillation can be stably performed in the two frequency bands, like the embodiments of FIGS. 1 to 3.

Figure 8:
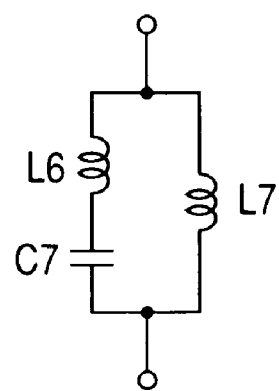
FIG. 8 is a circuit diagram showing another configuration of another feedback unit in an oscillator circuit according to the invention.
Figure 9:
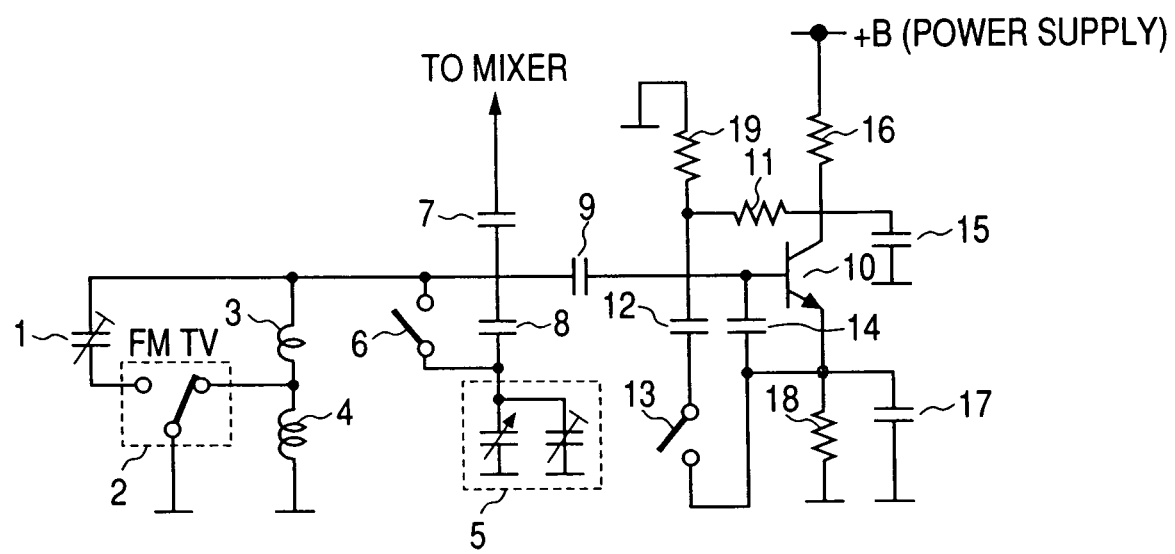
FIG. 9 is a circuit diagram showing the configuration of an oscillator circuit according to the related art.

Moreover, as shown in FIG. 8, the second feedback unit 26 may have a series resonance circuit, which has a seventh capacitive element C7 and a sixth inductive element L6 connected in series, and a seventh inductive element L7 connected in series to the series resonance circuit, instead of the series-parallel connection circuit having the sixth capacitive element C6, the fourth inductive element L4, and the fifth inductive element L5. Further, these series-parallel connection circuits may be used for the first feedback unit 25 and the third inductive element L3 may be used for the second feedback unit 26. In addition, the series-parallel connection circuit may be used for both the first and second feedback units 25 and 26.

According to the first aspect of the invention, the resonance circuit is configured such that the resonance frequency is changed in correspondence with two different frequency bands. Further, one of the first feedback unit and the second feedback unit is configured by series-parallel connection of the three reactive elements so as to exhibit one of the inductive and capacitive characteristics in the two frequency bands, and the other feedback unit is configured so as to exhibit the same characteristic as that of one feedback unit in the two frequency bands. Therefore, negative resistance can be obtained on the oscillating transistor in the two frequency bands, without changing a capacitance value or inductance value of the feedback unit. As a result, the oscillator circuit can stably oscillate in the two frequency bands.

According to the second aspect of the invention, one of the first feedback unit and the second feedback unit has the first capacitive element, and the other has the parallel resonance circuit, which has the second capacitive element and the first inductive element connected parallel to each other, and the third capacitive element connected in series to the parallel resonance circuit. In this case, a Colpitts oscillator circuit, in which an equivalent capacitance value of the feedback unit can be switched with the minimum number of circuit components, can be implemented.

According to the third aspect of the invention, each of the first feedback unit and the second feedback unit has the parallel resonance circuit, which has the second capacitive element and the first inductive element connected parallel to each other, and the third capacitive element connected in series to the parallel resonance circuit. In this case, a Colpitts oscillator circuit, in which an equivalent capacitance value of each of the two feedback units can be switched together and which has excellent stability, can be implemented.

According to the fourth aspect of the invention, one of the first feedback unit and the second feedback unit has the first capacitive element, and the other has the parallel resonance circuit, which has the fourth capacitive element and the second inductive element connected in series, and the fifth capacitive element connected parallel to the parallel resonance circuit. In this case, a Colpitts oscillator circuit, in which an equivalent capacitance value of the feedback unit can be switched with the minimum number of circuit components, can be implemented.

According to the fifth aspect of the invention, each of the first feedback unit and the second feedback unit has the series resonance circuit, which has the fourth capacitive element and the second inductive element connected in series, and the fifth capacitive element connected parallel to the series resonance circuit. In this case, a Colpitts oscillator circuit, in which an equivalent capacitance value of each of the two feedback units can be switched together and which has excellent stability, can be implemented.

According to the sixth aspect of the invention, the resonance circuit has the inductor and the capacitive unit connected parallel to the inductor, and the inductance value of the inductor is switched different in the two frequency bands. In this case, oscillation can be switched in two frequency bands.

According to the seventh aspect of the invention, the capacitive unit has the varactor diode, to which a control voltage for changing an oscillation frequency is applied. Therefore, a voltage-controlled oscillator circuit can be implemented.

The invention claimed is:

1. A dual band voltage-controlled oscillator circuit comprising:
   an oscillating transistor;
   a resonance circuit that is interposed between a collector and a base of the oscillating transistor;
   a first feedback unit that is interposed between the base and an emitter of the oscillating transistor; and
   a second feedback unit that is interposed between the collector and the emitter of the oscillating transistor,
   wherein the resonance circuit is configured such that a resonance frequency is changed in correspondence with two different frequency bands,
   one of the first feedback unit and the second feedback unit is configured by series-parallel connection of three reactive elements so as to exhibit one of inductive and capacitive characteristics in the two frequency bands, and
   the other feedback unit is configured so as to exhibit the same characteristic as that of one feedback unit in the two frequency bands.

2. The dual band voltage-controlled oscillator circuit according to claim 1,
   wherein one of the first feedback unit and the second feedback unit has a first capacitive element, and
   the other has a parallel resonance circuit, which has a second capacitive element and a first inductive element connected parallel to each other, and a third capacitive element connected in series to the parallel resonance circuit.

3. The dual band voltage-controlled oscillator circuit according to claim 1,
   wherein each of the first feedback unit and the second feedback unit has a parallel resonance circuit, which has a first capacitive element and a second inductive element connected parallel to each other, and a third capacitive element connected in series to the parallel resonance circuit.

4. The dual band voltage-controlled oscillator circuit according to claim 1,
   wherein one of the first feedback unit and the second feedback unit has a first capacitive element, and
   the other has a parallel resonance circuit, which has a first capacitive element and a first inductive element connected in series, and a third capacitive element connected parallel to the parallel resonance circuit.

5. The dual band voltage-controlled oscillator circuit according to claim 1,
   wherein each of the first feedback unit and the second feedback unit has a series resonance circuit, which has a first capacitive element and a first inductive element connected in series, and a second capacitive element connected parallel to the series resonance circuit.

6. The dual band voltage-controlled oscillator circuit according to claim 1, wherein the resonance circuit has an inductor and a capacitive unit connected parallel to the inductor, and an inductance value of the inductor is switched different in the two frequency bands.

7. The dual band voltage-controlled oscillator circuit according to claim 6, wherein the capacitive unit has a varactor diode, to which a control voltage for changing an oscillation frequency is applied.

* * * * *